3,773,927
PREPARATION OF AN AQUEOUS SLURRY OF AMMONIUM CHLORIDE AND METHYLMERCAPTO-HYDROXYBUTYRIC ACID
Earl W. Cummins, Wilmington, Del., assignor to E. I. du Pont de Nemours and Company, Wilmington, Del.
No Drawing. Filed Dec. 20, 1971, Ser. No. 210,199
Int. Cl. A23k 1/00; A61k 27/00
U.S. Cl. 424—166                     9 Claims

ABSTRACT OF THE DISCLOSURE

A process for preparing high strength aqueous solutions of γ-methylmercapto-α-hydroxybutyric acid (MHBA) by hydrolyzing γ-methylmercapto - α - hydroxybutyronitrile (MHBN) with HCl under controlled conditions.

BACKGROUND OF THE INVENTION

This invention relates to the preparation of a high strength liquid feed supplement that can be used in place of calcium γ - methylmercapto - α - hydroxybutyrate for the fortification of animal feeds.

This liquid feed supplement is prepared by the hydrolysis of γ - methylmercapto - α - hydroxybutyronitrile (MHBN) with hydrochloric acid at high concentrations of MHBN. The reaction proceeds as summarized in the following equation to give γ - methylmercapto - α - hydroxybutyric acid (MHBA):

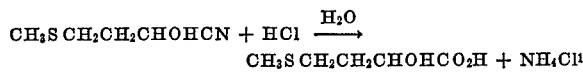

$$CH_3S\,CH_2CH_2CHOHCN + HCl \xrightarrow{H_2O}$$
$$CH_3S\,CH_2CH_2CHOHCO_2H + NH_4Cl$$

The ammonium chloride forms as a separate phase which can be removed by standard procedures, such as centrifugation, to give a product containing from 45 to 70% MHBA. The action mass can be concentrated under reduced pressure to give a more concentrated solution from which the by-product ammonium chloride can be removed by a standard procedure such as centrifugation.

The process of this invention represents a major advance over the prior art. Previously, MHBN has been hydrolyzed with 1.5 moles of hydrochloric acid for 60 hours at room temperature (U.S. 2,745,745). When the hydrolysis of MHBN was performed with sulfuric acid the most concentrated solution of MHBA that has been obtained directly was less than 45%.

SUMMARY OF THE INVENTION

The process of the invention is defined as a process for preparing an aqueous slurry of ammonium chloride containing about 45–90% by weight MHBA in the liquid phase which comprises hydrolyzing γ - methylmercapto-α - hydroxybutyronitrile by adding the γ - methylmercapto - α - hydroxybutyronitrile to agitated hydrochloric acid over a period of about 0.5 to 4 hours, the hydrochloric acid being present to the extent of about 1.0–1.3 moles per mole of γ - methylmercapto - α hydroxybutyronitrile and the hydrochloric acid strength being within the range of 20–40% by weight; maintaining the temperature within the range of about 50–100° C. during the γ - methylmercapto - α - hydroxybutyronitrile addition; and then heating the mixture to a temperature within the range of 80–110° C. and maintaining this temperature for a period of time ranging from 5 minutes to 3 hours to complete the hydrolysis and provide the slurry.

Preferably the MHBN is added to 1.1 to 1.2 moles of 31 to 38 weight percent hydrochloric acid during 1 to 2 hours while the temperature is maintained between 60 to 80° C. and then heating to 85 to 100° C. and maintaining this temperature for 15 minutes to two hours to complete the hydrolysis.

The product can be vacuum distilled to remove water and other by-products from the reaction mass.

The product of the invention is the above product comprising an aqueous solution of MHBA containing 45–90% MHBA by weigh and les sthan 4% HCl by weight.

The product may contain MHBA dimer, MHBA cyclic dimer, MHBA trimer and smaller amounts of tetramers in addition to monomer. For example, a solution that contains a total of 55 to 70% MHBA about 3–5% relative will be in the form of the linear dimer, less than 0.5% as the linear trimer and about 0.5 to 4% as the cyclic dimer when the solution is at equilibrium.

The product of the invention is useful as a high strength liquid feed supplement for methione fortification of the food of animals such as cattle, poultry, sheep, etc.

DETAILED DESCRIPTION OF THE INVENTION

The hydrochloric acid which can be employed in this invention is an article of commerce, and the MHBN can be prepared as described in U.S. Pat. 2,745,745.

The hydrolysis of MHBN is preferably performed by adding the MHBN to the hydrochloric acid during 30 minutes to 4 hours, preferably 1 hour to 2 hours, since then only the amount of MHBN added can be hydrolyzed. Using the reverse procedure, the reaction can become uncontrollable as all of the MHBN can be partially hydrolyzed by the addition of only a small amount of acid.

The amount of hydrochloric acid used should be between 1.0 and 1.3 moles, preferably 1.1 to 1.2 moles per mole of technical MHBN. The strength of the hydrochloric acid can be from 20 to 40%, preferably from 31 to 38%.

The reaction temperature during the MHBN addition is preferably maintained at 50–100° C., most preferably at 60 to 80° C., by external cooling. After the MHBN addition is complete, a short hold period of about 10 minutes is followed by heating to 80 to 110° C., preferably 85 to 100° C., and maintaining at this temperature for 5 minutes to three hours, preferably 15 to 120 minutes, in order to complete the hydrolysis.

Ammonium chloride precipitates out of the reaction mass about half way through the MHBN addition described above and the final reaction mass is a fairly thick slurry. To obtain a product which will not deposit crystals during storage it is necessary to reduce the concentration of ammonium chloride to a level such that saturated solutions do not result when exposed to the minimum temperatures encountered in storage. A product that will not deposit solids at temperatures down to 0° C. can be obtained by cooling the reaction mass to 0° C. and removing the solid phase ammonium chloride by standard procedures such as centrifuging or filtration followed by washing the cake with a minimum amount of water to prevent loss of product. The more concentrated wash liquor is added to the filtrate, while the remaining wash liquor is recycled back to the MHBN hydrolysis step. In this manner about 78% of the total theoretical ammonium chloride can be removed.

A product containing much less ammonium chloride and fewer by-products can be obtained by removing water from the reaction mass by reduced pressure distillation. Reduced pressures are preferred in order to prevent overheating which can result in by-product formation. For example, when a reaction mass was concentrated to 86% total MHBA content (including dimer, cyclic dimer, and trimer) and centrifuged at room temperature, about 97% of the total theoretical amount of ammonium chloride was removed. In addition, a considerable amount of vile smelling sulfide-containing by-products was removed during the distillation.

The product prepared in this manner can now be diluted with water and a small amount of hydrochloric acid added, if desired (most of the hydrochloric acid is removed in the distillation step), to give a product containing 45 to 70% MHBA equivalent. Heating the resulting product at 90° C. for 1 hour will hydrolyze most of the polymeric materials to give the equilibrium product stable at 45 to 70% concentration.

By the use of the above procedures, a product containing from 45 to 90% MHBA can be obtained with 50 to 75% being preferred. The product may also contain up to 4% hydrochloric acid, preferably less than 2½%.

The MHBA exists in equilibrium with its polymeric ester in concentrated aqueous solutions as illustrated below:

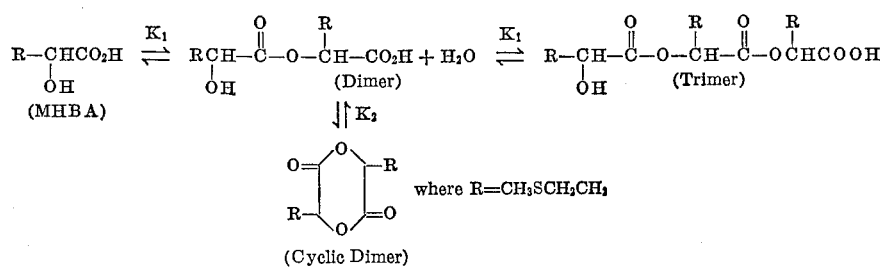

Higher polymers can, of course, exist; however, in the range of 40 to 90% total MHBA content (monomer and polymers) only traces of these higher polymers exist.

The value of $K_1$ has been found to be about $.107 \pm .002$ and $K_2$ about $15.5 \pm 3.5$. This means that a product containing 85% total MHBA (monomer and polymers) contains about 64.5% MHBA, 10.8% dimer, 9.3% cyclic dimer and 1.3% trimer (all calculated on a MHBA basis). A 60% total MHBA product (monomer and polymers) prepared by diluting and equilibrating the above product contains about 57% MHBA, 2.2% linear dimer and 0.8% cyclic dimer with only trace amounts of linear trimer. The above applies to products made by concentration of the original hydrolysis reaction mass. A 60% product prepared directly would have higher amounts of polymer due to the reduced water concentration (higher ammonium chloride and by-product concentration) present in this type of product.

In the examples, all parts are by weight unless otherwise indicated.

Example 1

A round-bottom flask is equipped with an agitator, thermometer, water-cooled condenser and dropping funnel, and is charged with 139.1 parts of 31.4% (20° Bé.) aqueous hydrochloric acid at 40° C. The dropping funnel is charged with 131.2 parts of technical γ-methylmercapto-α-hydroxybutyronitrile (MHBN) (mol ratio of HCl to MHBN=1.2). The MHBN is added to to the well-agitated acid during one hour. When about 25% of the MHBN is added, the temperature increases to 60° C. where it is maintained by external cooling throughout the remainder of the addition. Ammonium chloride begins to crystallize from the reaction mass, after about half of the MHBN has been added. When the MHBN addition is complete the brown reaction mass is maintained at 60° C. for 15 minutes and then heated rapidly to 90° C. and maintained at this temperature for 30 minutes to complete the hydrolysis. The almost black slurry is now sampled by removing an aliquot, cooled to 0° C., and centrifuged to give 228 parts of clear, dark liquid. The weight of this liquid is calculated from the chloride analysis of the reaction mass and the final liquid product, along with a compensation for the weight of the sample removed from the reaction mass, and includes liquid retained in the cake.

$$W_L = \frac{W_s - 53.5 W_s M_s}{1 - 53.5 M_L}$$

where $W_L$ is total weight of liquid, parts;
$W_s$ is total weight of slurry, parts;
$M_s$ is moles of chloride ion per part of slurry;
$M_L$ is moles of chloride ion per part of liquid;
and 53.5 is the molecular weight of $NH_4Cl$.

Analysis for MHBA in the liquid product by a gas chromatographic procedure specific for monomeric MHBA indicates the yield to be 90.5% based on a 90.4% purity of the starting material also as determined by a gas chromatographic procedure. When the liquid product is hydrolyzed by dilution with an excess of water and heated at 90° C., a gas chromatographic analysis indicates a yield of 98.5% on the same basis as above. This is equivalent to a concentration of 58% MHBA in the original product.

Example 2

A glass vessel equipped as described in Example 1 is charged with 301 parts of 31.4% (20° Bé.) hydrochloric acid while 262.4 parts of MHBN are added to the funnel (mol ratio of HCl to MHBN=1.3).

The MHBN is added during 2 hours while the temperature is maintained at 60° C. after the initial rise from 40° C. After a 30-minute hold period the temperature is increased to 85° C. and maintained for 2 hours. The apparatus is now rigged for distillation and 143 parts of distillate is removed at reduced pressure so that the pot temperature does not exceed 90° C.

A considerable amount of vile smelling sulfide containing by-products is removed during the distillation.

The reaction mass is now cooled to room temperature and centrifuged to give 314 parts of clear dark liquid. (The weight of liquid is calculated as in Example 1.) Analysis of this liquid as in Example 1 shows it to contain 226 parts of monomeric MHBA, equivalent to a 83.5% yield based on the 90.3% MHBN content of the starting material. When a sample of this material is boiled with excess water and a small amount of hydrochloric acid to hydrolyze polymeric material and then analyzed for monomeric MHBA by the gas chromatographic procedure, the yield of MHBA is found to be 100%. This is equivalent to a concentration of 86% MHBA in the original product.

When the original product above, corresponding to the 83.5% yield is heated at 90° C. and samples are removed until a constant amount of 0.1 N NaOH is required to neutralize the samples, the acid content drops from 1.61 moles to 1.46 moles which shows that the original product is not at equilibrium and that additional polymer can be formed.

Example 3

A glass vessel equipped as in Example 1 is charged with 227 parts of 36.9% (22.9° Bé.) hydrochloric acid preheated to 40° C., and 262.4 parts of MHBN (mol ratio of HCl to MHBN=1.15) are added during 30 minutes. After the temperature has spontaneously reached 80° C. it is maintained at this temperature by external cooling. After holding at this temperature for 10 minutes upon completion of the acid addition, the temperature is increased to 100° C. by external heating and maintained at this temperature for 15 minutes.

The apparatus is assembled for reduced pressure distillation and 70 parts of distillate removed at a pressure such that the pot temperature is maintained at 100° C. The reaction mass is now cooled to room temperature, centrifuged and the cake is washed with two portions of 25 parts of water each. The first wash is combined with the main portion of product and the second portion is added to a subsequent batch at the MHBN hydrolysis stage to prevent loss of product.

The combined product and first wash are diluted with water and 10 mls. of 20° Bé. hydrochloric acid to give a solution containing 60% MHBA both as free acid and polymer. The resulting solution is heated at 100° C. for 1 hour to hydrolyze the polymer and then cooled. The resulting product has a much more agreeable odor than the material prepared in Example 1.

I claim:

1. A process for preparing an aqueous slurry of ammonium chloride comprising about 45–90% by weight $\gamma$-methylmercapto-$\alpha$-hydroxybutyric acid (MHBA) in the liquid phase which comprises hydrolyzing $\gamma$-methylmercapto-$\alpha$-hydroxybutyronitrile (MHBN) by adding the MHBN to hydrochloric acid while agitating over a period of about 0.5 to 4 hours, the hydrochloric acid being present in an amount of about 1.0–1.3 moles per mole of MHBN and the hydrochloric acid strength being within the range of 20–40% by weight, maintaining the temperature within the range of 80–110° C. and maintaining this temperature tion; and then heating the mixture to a temperature within the range of 80–110° C. and maintaining this temperature for a period of time ranging from 5 minutes to 3 hours to complete the hydrolysis and provide the slurry.

2. The process of claim 1 wherein the $\gamma$-methylmercapto-$\alpha$-hydroxybutyronitrile (MHBN) is added to the hydrochloric acid over a period of time of 1 to 2 hours.

3. The process of claim 1 wherein there are 1.1–1.2 moles of hydrochloric acid per mole of $\gamma$-methylmercapto-$\alpha$-hydroxybutyronitrile (MHBN).

4. The process of claim 1 wherein the strength of the hydrochloric acid is within the range of 31–38%.

5. The process of claim 1 wherein the temperature during the $\gamma$-methylmercapto-$\alpha$-hydroxybutyronitrile (MHBN) addition is maintained within the range of 60–80° C. by external cooling.

6. The process of claim 1 wherein the slurry is then cooled to a temperature at least as low as that which will be encountered during subsequent storage of the slurry to further precipitate ammonium chloride from the slurry and then removing the precipitated ammonium chloride from the slurry to provide a solution of MHBA.

7. The process of claim 6 wherein the solution is cooled to 0° C.

8. The process of claim 1 wherein the slurry is then subjected to reduced pressure and vacuum distilled to further precipitate ammonium chloride, to further concentrate the slurry and remove water and other by-products from the slurry.

9. The process of claim 8 wherein the precipitated ammonium chloride is then removed.

References Cited
UNITED STATES PATENTS

| | | | |
|---|---|---|---|
| 2,745,745 | 5/1956 | Blake et al. | 260—535 |
| 2,938,053 | 5/1960 | Blake et al. | 260—535 |
| 3,272,860 | 9/1966 | Nafer | 260—535 |

SAM ROSEN, Primary Examiner

U.S. Cl. X.R.

99—2; 260—535 R; 424—317

UNITED STATES PATENT OFFICE
CERTIFICATE OF CORRECTION

Patent No. 3,773,927  Dated November 20, 1973

Inventor(s) Earl W. Cummins

It is certified that error appears in the above-identified patent and that said Letters Patent are hereby corrected as shown below:

In Column 5, Claim 1, lines 30-31, the phrase

"80-110°C. and maintaining this temperature tion"

should read

--about 50-100°C. during the MHBN addition--.

Signed and sealed this 30th day of July 1974.

(SEAL)
Attest:

McCOY M. GIBSON, JR.
Attesting Officer

C. MARSHALL DANN
Commissioner of Patents